(12) United States Patent
Seo

(10) Patent No.: US 12,097,762 B2
(45) Date of Patent: Sep. 24, 2024

(54) DISPLAY DEVICE FOR VEHICLE

(71) Applicant: HYUNDAI MOBIS Co., Ltd., Seoul (KR)

(72) Inventor: Jun Seong Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 280 days.

(21) Appl. No.: 17/854,440

(22) Filed: Jun. 30, 2022

(65) Prior Publication Data

US 2023/0182568 A1 Jun. 15, 2023

(30) Foreign Application Priority Data

Dec. 10, 2021 (KR) .................. 10-2021-0176859

(51) Int. Cl.
| | | |
|---|---|---|
| *G02B 27/01* | (2006.01) | |
| *B60K 35/00* | (2006.01) | |
| *B60K 35/50* | (2024.01) | |
| *B60K 35/22* | (2024.01) | |
| *B60K 35/53* | (2024.01) | |

(52) U.S. Cl.
CPC .............. *B60K 35/00* (2013.01); *B60K 35/50* (2024.01); *B60K 35/22* (2024.01); *B60K 35/53* (2024.01)

(58) Field of Classification Search
CPC ........ B60K 35/00; B60K 35/50; B60K 35/22; B60K 35/53; B60K 2360/816; B60R 2011/0085; B60R 2011/0092; B60R 11/0235; B60R 11/0229; B60R 2011/0003; G09F 21/049

See application file for complete search history.

(56) References Cited

U.S. PATENT DOCUMENTS

| | | | |
|---|---|---|---|
| 2005/0056734 A1* | 3/2005 | Lee | B60R 11/0235 248/27.3 |
| 2006/0108900 A1* | 5/2006 | Lee | B60R 11/0235 361/679.21 |
| 2013/0279015 A1* | 10/2013 | Ishibashi | B60K 35/60 359/630 |
| 2021/0216183 A1* | 7/2021 | Kang | G09F 9/301 |
| 2024/0049411 A1* | 2/2024 | Jang | H05K 5/0217 |
| 2024/0111128 A1* | 4/2024 | Miyoshi | G02B 27/0149 |

\* cited by examiner

*Primary Examiner* — Amy J. Sterling
(74) *Attorney, Agent, or Firm* — Morgan, Lewis & Bockius LLP

(57) ABSTRACT

Various aspects of the present disclosure are directed to providing a display device for a vehicle, which is to be installed in an interior of the vehicle, the device comprising: a display that displays an image; a support structure that supports the display to be movable; and a driving device connected to the display and the support structure to move the display, wherein the driving device comprises: a motor that generates a driving force; a roller connected to the motor to be rotated by the driving force of the motor; and at least one rotational elastic member disposed between the display and the support structure.

13 Claims, 4 Drawing Sheets

DISPLAY DEVICE FOR VEHICLE

CROSS-REFERENCE TO RELATED APPLICATION

The present application claims priority to Korean Patent Application No. 10-2021-0176859, filed on Dec. 10, 2021, the entire contents of which is incorporated herein for all purposes by this reference.

TECHNICAL FIELD

The present disclosure relates to a display device for a vehicle.

BACKGROUND

The content described in this part simply provides background information on the present disclosure and does not constitute the prior art.

A display device is installed at a front side in the interior of a vehicle. The display device may display information related to driving of the vehicle, the state of the vehicle, and the convenience of a passenger, and may provide a manipulation unit for manipulating various functions of the vehicle to the passenger.

The display device may display information on a route from a departing place of the vehicle to a destination, a current location of the vehicle, and the like. The display device may reproduce music or video, and may display broadcast contents by receiving a signal for terrestrial or satellite broadcasting. The display device may display information for convenience of the passenger, such as news, weather, etc. The display device may provide the passenger with a manipulation unit fort manipulating functions of navigation, music, and air conditioner of the vehicle, for example.

As information displayed by the display device and functions of the display device become more diverse, the size of the display device is being increased. There is a tendency that a single display with a large size or a plurality of displays with a smaller size than that of the single display is installed in the vehicle.

In addition to the display device, various components such as a clock, an emergency light switch, and an air discharge port of the air conditioner may be installed on the front side in the interior of the vehicle. To install a single display with a large size or a plurality of displays with a small size at the front side in the interior of the vehicle, it is necessary to efficiently utilize the interior space of the vehicle.

To efficiently utilize the interior space of the vehicle, it is necessary to move the display device along a curved path as well as a straight path. However, in the case that the display device is moved along the curved path, there is a problem that it is difficult to support the display device firmly and stably.

SUMMARY

Various aspects of the present disclosure are directed to providing a display device for a vehicle, which is to be installed in an interior of the vehicle, the device comprising: a display that displays an image; a support structure that supports the display to be movable; and a driving device connected to the display and the support structure to move the display, wherein the driving device comprises: a motor that generates a driving force; a roller connected to the motor to be rotated by the driving force of the motor; and at least one rotational elastic member disposed between the display and the support structure.

DETAILED DESCRIPTION

Figure 1:
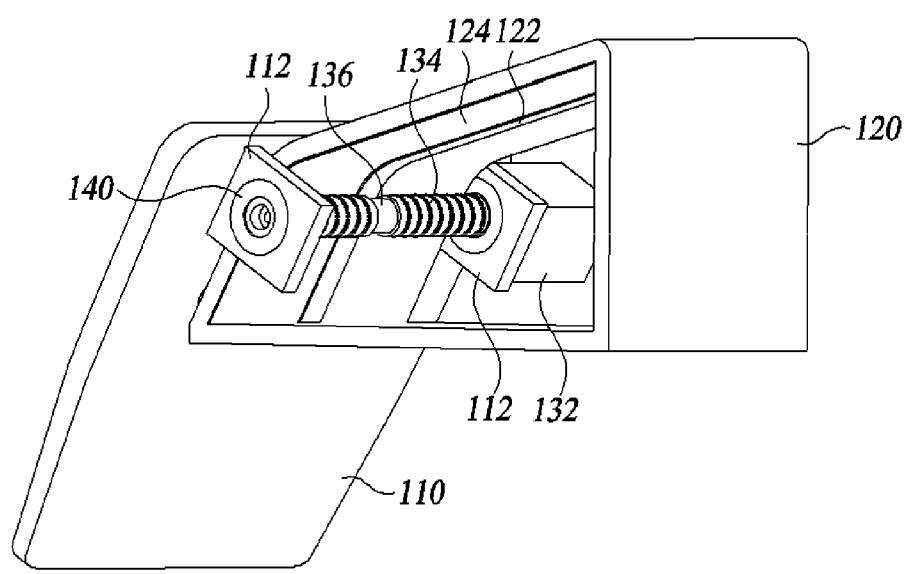
FIG. 1 is a perspective view of a display device for a vehicle according to one embodiment of the present disclosure.

In view of the above, the present disclosure provides a display device for a vehicle capable of efficiently utilizing an interior space of the vehicle by moving a display using a driving device.

Further, the present disclosure provides a display device for a vehicle capable of firmly and stably supporting a display even in the case that the display moves along a curved path by disposing a rotational elastic member between the display and a support structure.

The objects to be achieved by the present disclosure are not limited to the above-mentioned objects, and other objects not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a perspective view of a display device for a vehicle according to one embodiment of the present disclosure.

Figure 2:
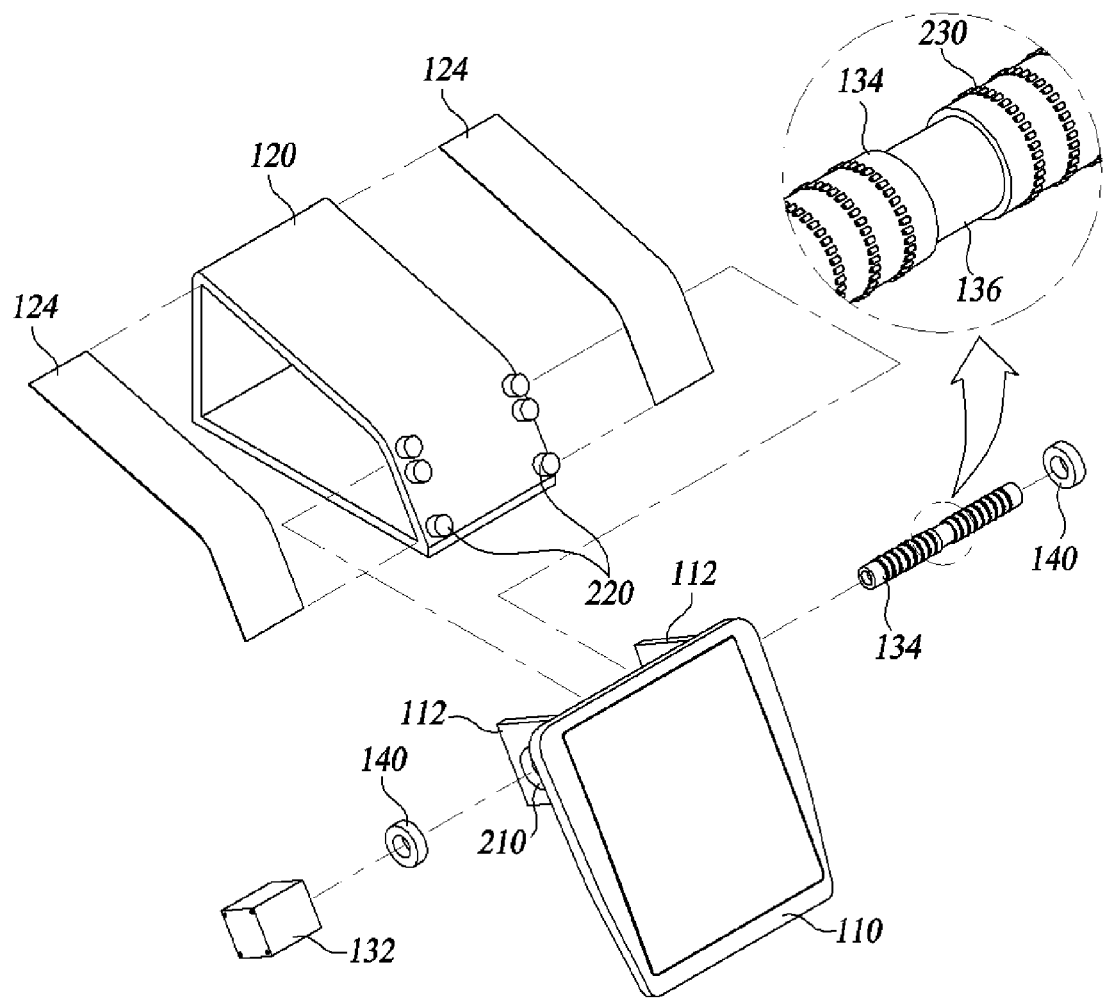
FIG. 2 is an exploded perspective view of the display device for a vehicle according to one embodiment of the present disclosure.

FIG. 2 is an exploded perspective view of the display device for a vehicle according to one embodiment of the present disclosure.

Figure 3:
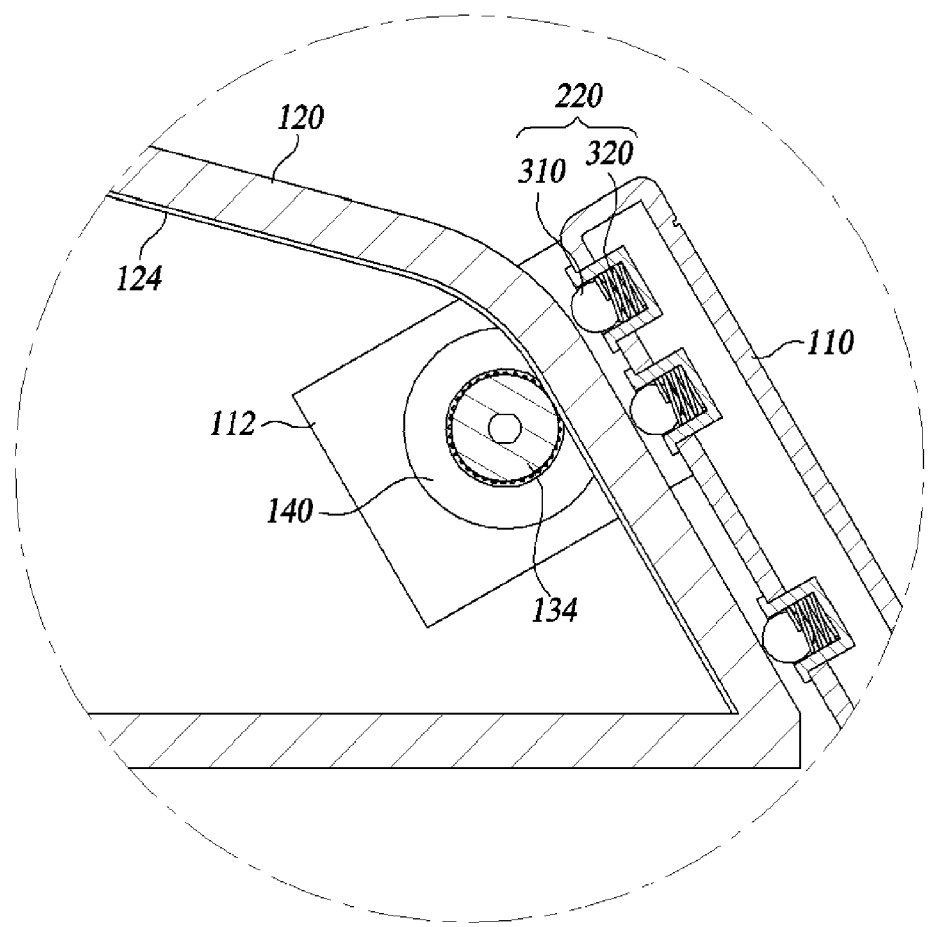
FIG. 3 is a side cross-sectional view of the display device for a vehicle and an internal structure of a rotational elastic member according to one embodiment of the present disclosure.

FIG. 3 is a side cross-sectional view of the display device for a vehicle and an internal structure of a rotational elastic member according to one embodiment of the present disclosure.

Referring to FIGS. 1 to 3, the display device for a vehicle according to one embodiment of the present disclosure may include a display 110, a support structure 120, a driving device 130, and a bearing 140.

The display 110 may include a coupling part 112 with an insertion hole 210.

The support structure 120 may include a guiding protrusion 122 and a friction sheet 124.

The driving device 130 may include a motor 132, a roller 134, and a rotational elastic member 220.

The roller 134 may include a guiding groove 136 and a fine protrusion 230.

The rotational elastic member 220 may include a rotating part 310 and an elastic part 320.

The display 110 may be an electronic screen (e.g., LCD, LED, etc.) that displays information related to driving of the vehicle. The display 110 may provide a manipulation button and the like to a passenger such that the passenger manipulates various functions of the vehicle. The display 110 is movably supported by the support structure 120. The display 110 may move along one surface of the support structure 120. Information related to driving of the vehicle may be displayed on one surface of the display 110. The rotational elastic member 220 may be disposed between the other surface of the display 110 and the one surface of the support structure 120.

The coupling part 112 may be formed on the other surface of the display 110 to protrude from the display 110 toward the support structure 120. A plurality of coupling parts 112 may be provided, and the plurality of coupling parts 112 may be formed at both ends of the display 110 in a direction perpendicular to a moving direction of the display 110. The insertion hole 210 may be formed in at least a portion of the coupling part 112. At least a part of the roller 134 may be inserted into the insertion hole 210. As the roller 134 is inserted into the insertion hole 210, the display 110, the support structure 120, and the driving device 130 may be connected. As the roller 134 rotates, the display 110 may move on one surface of the support structure 120.

The support structure 120 supports the display 110 to be movable. The support structure 120 is connected to the display 110 and the driving device 130. The rotational elastic member 220 is disposed between one surface of the support structure 120 and the other surface of the display 110. The display 110 may move along one surface of the support structure 120. A curved surface may be formed in at least a portion of the support structure 120. As the display 110 moves on the curved surface of the support structure 120, the display 110 may move along a curved path. The roller 134 may be in contact with the other surface of the support structure 120. The roller 134 may move along the other surface of the support structure 120.

The guiding protrusion 122 may be formed on at least a portion of the support structure 120. The guiding protrusion 122 may be formed on the other surface of the support structure 120 along a movement path of the display 110. The guiding protrusion 122 may be inserted into the guiding groove 136 formed in the roller 134. As the guiding protrusion 122 is inserted into the guiding groove 136, the movement of the display 110 may be guided.

The friction sheet 124 may be disposed on the other surface of the support structure 120. The friction sheet 124 may be disposed, on both sides of the guiding protrusion 122, on the other surface of the support structure 120. The friction sheet 124 may be disposed between the roller 134 and the support structure 120. The movement efficiency of the display 110 may be improved by the friction force between the friction sheet 124 and the roller 134, and the operation noise may be reduced. The friction sheet 124 may be formed of a rubber material.

The driving device 130 is connected to the display 110 and the support structure 120. The driving device 130 may move the display 110 along one surface of the support structure 120 using a driving force.

The motor 132 generates a driving force. The motor 132 is connected to at least a part of the roller 134 and transmits the driving force to the roller 134. The motor 132 may rotate the roller 134 using the driving force. The motor 132 may be installed in any one of a plurality of coupling parts 112. As the display 110 moves, the motor 132 may move together with the display 110.

The roller 134 is connected to one side of the motor 132 to receive the driving force from the motor 132. The roller 134 may be rotated by the driving force. One end and the other end of the roller 134 may be inserted into the insertion hole 210 of the coupling part 112. As the roller 134 is inserted into the insertion hole 210, the display 110, the support structure 120, and the driving device 130 may be connected. As the roller 134 rotates, the display 110 may move along one surface of the support structure 120. The bearing 140 may be disposed between the roller 134 and the insertion hole 210. The friction sheet 124 may be disposed between the roller 134 and the other surface of the support structure 120.

The guiding groove 136 may be formed in at least a part of the roller 134. The guiding protrusion 122 may be inserted into the guiding groove 136. By inserting the guiding protrusion 122 into the guiding groove 136, the movement of the display 110 may be guided.

The fine protrusion 230 may be formed on at least a part of the roller 134. A plurality of fine protrusions 230 may be provided. The fine protrusion 230 may be formed to be in contact with the friction sheet 124. As the fine protrusion 230 is formed on the roller 134, the friction force between the roller 134 and the friction sheet 124 increases. As the friction force between the roller 134 and the friction sheet 124 increases, the movement efficiency of the display 110 may be improved.

The rotational elastic member 220 may be disposed between the other surface of the display 110 and one surface of the support structure 120. A plurality of rotation elastic members 220 may be provided. The plurality of rotational elastic members 220 may be disposed on the display 110 along the moving direction of the display 110. The rotational elastic member 220 may include the rotating part 310 and the elastic part 320. The rotational elastic member 220 may be a ball plunger.

The rotating part 310 may be disposed to be in contact with one surface of the support structure 120. The rotating part 310 rotates depending on the movement of the display 110. The elastic part 320 may be disposed on the opposite side of the support structure 120 with respect to the rotating part 310. The elastic part 320 pushes the rotating unit 310 using an elastic force to be in contact with one surface of the support structure 120. The elastic part 320 pushes the rotating part 310 toward the support structure 120. As the elastic part 320 pushes the rotating unit 310 using an elastic force, even in case that the display 110 moves in a curved path, the rotating part 310 contacts the support structure 120. The display 110 is stably supported by the support structure 120 through the rotational elastic member 220 on the curved path. As a result, the display 110 may stably move along the curved path. The rotating part 310 may be formed of a metal material in a sphere shape. The elastic part 320 may be a spring.

The bearing 140 may be disposed in the insertion hole 210. The bearing 140 may be disposed between the coupling part 112 and the roller 134. A plurality of bearings 140 may be provided.

Figure 4:
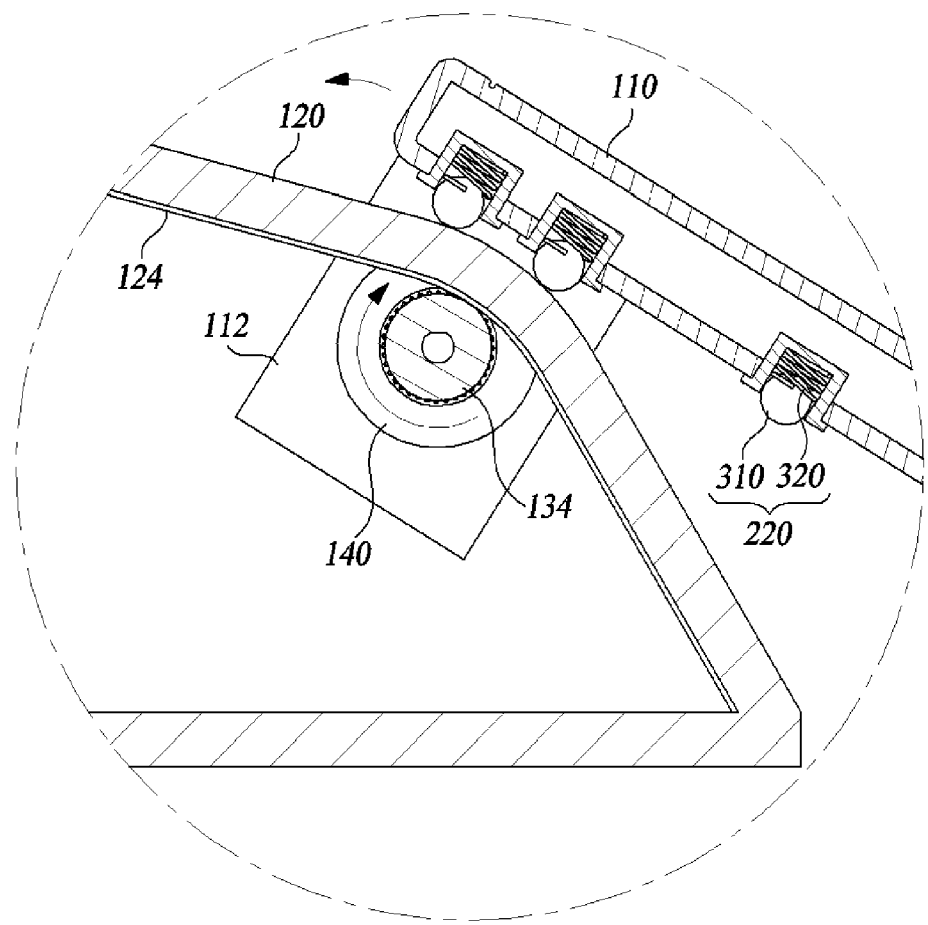
FIG. 4 is a diagram illustrating an operation principle of the display device for a vehicle according to one embodiment of the present disclosure.

FIG. 4 is a diagram illustrating an operation principle of the display device for a vehicle according to one embodiment of the present disclosure.

The operation principle and an effect of the display device for a vehicle according to one embodiment of the present disclosure will be described with reference to FIG. 4.

The roller 134 is rotated by the driving force of the motor 132. As the roller 134 rotates, the display 110 moves on one surface of the support structure 120. A plurality of rotational elastic members 220 is disposed between the display 110 and the support structure 120. The rotating part 310 is in contact with the one surface of the support structure 120. The elastic part 320 pushes the rotating part 310 using an elastic force to be contacted with the one surface of the support structure 120. As the elastic part 320 pushes the rotating part 310, even in case that the display 110 moves along the curved surface of the support structure 120, the rotating part 310 is contacted with the support structure 120. As a result, the display 110 may stably move along the curved path.

According to one embodiment, the display device for a vehicle can efficiently utilize an interior space in the vehicle by moving the display using the driving device.

According to one embodiment, the display device for the vehicle can firmly and stably support the display even in the case that the display moves along a curved path by disposing the rotational elastic member between the display and the support structure.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A display device for a vehicle, which is to be installed in an interior of the vehicle, the device comprising:
    a display that displays an image;
    a support structure that supports the display to be movable; and
    a driving device connected to the display and the support structure to move the display,
    wherein the driving device comprises:
    a motor that generates a driving force;
    a roller connected to the motor to be rotated by the driving force of the motor; and
    at least one rotational elastic member disposed between the display and the support structure.

2. The display device of claim 1, wherein the display further comprises:
    at least one coupling part disposed on the display to protrude from the display toward the support structure; and
    an insertion hole included in at least a portion of the coupling part, and
    wherein the display, the support structure, and the driving device are connected as the roller is inserted into the insertion hole.

3. The display device of claim 1, wherein
    at least a part of the support structure includes a curved surface, and the display moves along the curved surface.

4. The display device of claim 1, further comprising:
    a guiding protrusion disposed on at least a part of the support structure; and
    a guiding groove included in at least a part of the roller,
    wherein the guiding protrusion is inserted into the guiding groove.

5. The display device of claim 1, further comprising:
    a friction sheet disposed between the support structure and the roller.

6. The display device of claim 5, wherein
    the friction sheet includes a rubber material.

7. The display device of claim 1, wherein
    a plurality of fine protrusions is disposed on at least a part of the roller.

8. The display device of claim 1, wherein
    the at least one rotational elastic member comprises:
    a rotating part which is in contact with the support structure and rotates as the display moves; and
    an elastic part disposed on an opposite side of the support structure with respect to the rotation part.

9. The display device of claim 8, wherein
    the rotating part includes a metal material.

10. The display device of claim 8, wherein
    the rotating part has a sphere shape.

11. The display device of claim 8, wherein
    the elastic part is a spring.

12. The display device of claim 1, wherein
    the at least one rotational elastic member includes a plurality of rotational elastic members.

13. The display device of claim 1, wherein
    the at least one rotational elastic member is a ball plunger.

* * * * *